(12) United States Patent
Greb et al.

(10) Patent No.: US 11,982,351 B2
(45) Date of Patent: May 14, 2024

(54) PARKING LOCK ACTUATION SYSTEM WITH A DOUBLE-ACTING ACTUATION CYLINDER ON THE LOCKING ELEMENT, AND ACTUATION METHOD

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/003,291

(22) PCT Filed: Jun. 2, 2021

(86) PCT No.: PCT/DE2021/100479
§ 371 (c)(1),
(2) Date: Dec. 23, 2022

(87) PCT Pub. No.: WO2022/002297
PCT Pub. Date: Jan. 6, 2022

(65) Prior Publication Data
US 2023/0243422 A1  Aug. 3, 2023

(30) Foreign Application Priority Data
Jun. 29, 2020  (DE) ............. 10 2020 117 021.1

(51) Int. Cl.
*F16H 63/34* (2006.01)
*F16H 63/48* (2006.01)

(52) U.S. Cl.
CPC ....... *F16H 63/3483* (2013.01); *F16H 63/483* (2013.01)

(58) Field of Classification Search
CPC ....... F16H 63/3416–3491; F16H 63/36; F16H 63/48–483; F16H 61/0206; B60T 1/005
See application file for complete search history.

(56) References Cited

U.S. PATENT DOCUMENTS

| | | | |
|---|---|---|---|
| 6,698,555 B2* | 3/2004 | Schafer | F16H 63/483 188/170 |
| 9,261,188 B2* | 2/2016 | Ruehle | F16H 63/3475 |

(Continued)

FOREIGN PATENT DOCUMENTS

| | | | | |
|---|---|---|---|---|
| CN | 110588610 A | | 12/2019 | |
| DE | 102010043257 A1 * | | 5/2012 | F16H 63/3483 |

(Continued)

OTHER PUBLICATIONS

See Corresponding Search Report for International Application PCT/DE2021/100479.

*Primary Examiner* — Ernesto A Suarez
*Assistant Examiner* — James J Taylor, II
(74) *Attorney, Agent, or Firm* — Davidson, Davidson & Kappel, LLC

(57) ABSTRACT

A parking lock actuation system for a motor vehicle includes an actuation element that is coupled or can be coupled to a parking lock and can be moved between a locking position, in which the parking lock is active, and an unlocking position, in which the parking lock is inactive. The system includes a locking element which is designed to fix the actuation element in the unlocking position in a form-fitting manner. The actuation element and the locking element (4) are each operatively connected to a respective hydraulic actuation cylinder, and the two hydraulic actuation cylinders are connected to a common hydraulic fluid supply line by a pressure chamber and are coupled to a pump via a first valve. The actuation cylinder of the locking element additionally has an unlocking pressure chamber which counteracts the (Continued)

actuation cylinder pressure chamber and which can be coupled to the pump via a second valve.

20 Claims, 5 Drawing Sheets

(56) References Cited

U.S. PATENT DOCUMENTS

| | | |
|---|---|---|
| 10,435,001 B2 * | 10/2019 | Möhlmann ............. B60T 17/04 |
| 2014/0110216 A1 | 4/2014 | Pollack |
| 2018/0119816 A1 | 5/2018 | Gollmer et al. |

FOREIGN PATENT DOCUMENTS

| | | |
|---|---|---|
| DE | 10201105068 A1 | 7/2012 |
| DE | 102012016235 A1 | 2/2014 |
| DE | 102014018123 A1 | 6/2016 |
| DE | 102015214037 A1 | 1/2017 |
| DE | 102017102804 A1 | 8/2018 |
| JP | 2017226352 A * | 12/2017 |

* cited by examiner

PARKING LOCK ACTUATION SYSTEM WITH A DOUBLE-ACTING ACTUATION CYLINDER ON THE LOCKING ELEMENT, AND ACTUATION METHOD

CROSS-REFERENCE TO RELATED APPLICATIONS

This application is the U.S. National Phase of PCT Appln. No. PCT/DE2021/100479 filed Jun. 2, 2021, which claims priority to DE 10 2020 117 021.1, filed Jun. 29, 2020, the entire disclosures of which are incorporated by reference herein.

TECHNICAL FIELD

The present disclosure relates to a parking lock actuation system for a motor vehicle, preferably a hybrid or purely electric motor vehicle, comprising an actuation element that can be coupled or is coupled to a parking lock, which actuation element can be displaced between a locking position, in which the parking lock is active/an output component of the motor vehicle is locked against rotation, and an unlocking position, in which the parking lock is inactive/the rotation of the output component of the motor vehicle is released, and comprising a locking element designed for fixing/holding the actuation element in its unlocking position in a form-fitting manner. Furthermore, the present disclosure relates to a method for actuating said parking lock actuation system.

BACKGROUND

Parking lock actuation systems of the type in question are already well known from the prior art. For example, DE 10 2017 102 804 A1 discloses a device and a method for actuating a parking lock.

SUMMARY

In these designs known from the prior art, it has been found that the parking lock actuation system does, in principle, ensure that the parking lock engages automatically, but a transport state of the motor vehicle is not possible in which an on-board network is switched off or is not sufficiently charged or an internal combustion engine is switched off, and the parking lock remains engaged. What is referred to as limp-home functionality also cannot be realized either.

It is therefore an object of the present disclosure to provide a parking lock actuation system that allows transport of the motor vehicle and a limp-home functionality with simple means independently of the state of charge of an on-board network of the motor vehicle and independently of the state of a hydraulic system.

According to the present disclosure, this is achieved in that the actuation element and the locking element are each operatively connected to a hydraulic actuation cylinder, wherein the two hydraulic actuation cylinders are connected to a common hydraulic fluid supply line on the side of a pressure chamber and are coupled to a pump via a first valve, and wherein the actuation cylinder of the locking element furthermore has an unlocking pressure chamber which counteracts its pressure chamber and which can be coupled to the pump via a second valve.

With such a double-acting actuation cylinder on the locking element, a transport state and a limp-home functionality of the motor vehicle are made possible with simple means, while the parking lock is reliably unlocked/inactive when the hydraulic supply is depressurized. As a result, all other operating states of the parking lock actuation system can also be actuated easily.

Therefore, it has also turned out to be advantageous if the first valve is operatively inserted between an outlet of the pump on the one hand and the hydraulic fluid supply line on the other hand and is designed in such a way that, in its first position (preferably designed as a resiliently supported rest position), it depressurizes the hydraulic fluid supply line/connects it to a tank, while a line section further connected to the second valve is connected to the pump outlet, and, in its second position, connects the pump outlet to the hydraulic fluid supply line, while the line section further connected to the second valve is separated from the pump outlet. As a result, the individual operating states of the parking lock actuation system can be actuated easily. The first valve is more preferably implemented as a 4/2-way valve in order to keep the structure of the parking lock actuation system as simple as possible.

Furthermore, it is advantageous if the second valve is designed in such a way that, in its first position, it connects a pump-side line section to the unlocking pressure chamber and, in its second position, depressurizes the unlocking pressure chamber/connects it to a tank. This results in an efficiently actuable coupling of the locking element to the hydraulic side. The second valve is more preferably implemented as a 5/2-way valve in order to keep the structure of the parking lock actuation system as simple as possible.

It is also advantageous if the second valve is designed and connected in such a way that the pump-side line section is connected to a hydraulic actuation unit, preferably a clutch actuation unit, when the second valve is in the second position. As a result, the most compact possible system for supplying several components of the motor vehicle is designed to operate efficiently.

In this context, it is also expedient if the pump is coupled or can be coupled to further hydraulic consumers, preferably a gearshift element and/or a coolant supply device. The pump can then preferably be switched/actuated to supply all consumers.

For a simple structure, it is also advantageous if the pump is designed as a reversible pump.

For easy actuation of the actuation element, it is also expedient if an electrically actuated holding magnet holding the actuation element in its unlocking position is provided.

Furthermore, the present disclosure relates to a method for actuating a parking lock actuation system according to at least one of the embodiments of the present disclosure described above, wherein the actuation element, in a first operating state, is pressed into its unlocking position by connecting the hydraulic fluid supply line to the pump outlet and a corresponding pressure build-up at the pump outlet, while the locking element is spaced apart from the actuation element, and, in a second operating state, in a pressurized state of the pressure chamber of the actuation cylinder associated with the locking element, is pressed against the actuation element and comes into form-fitting engagement with the actuation element.

Furthermore, it is advantageous if the actuation element is spring-preloaded in such a way that, in the second operating state, in its unlocking position, it is pressed by this spring preload into a position reinforcing a self-locking connection between the locking element and the actuation element and the locking element is clamped to the actuation cylinder of the actuation element when the pressure drops again. As a result, the form-fitting contact between the locking element and the actuation element is implemented in the simplest possible way.

Further simplified actuation results from the fact that the form fit between the locking element and the actuation element is canceled again and the locking element returns to the position of the first operating state in that the unlocking pressure chamber is pressurized via the pump until the self-locking connection between the locking element and the actuation element is canceled.

In other words, according to the present disclosure, an actuation system for normally P parking locks with an additional transport function is implemented by means of a double-acting latching cylinder (actuation cylinder). In addition to the transport mode, a limp-home functionality is also enabled when a normally P parking lock is implemented. A purely hydraulic solution for the transport mode and the limp-home functionality is implemented via a parallel arrangement of the locking element cylinder and the parking lock cylinder.

BRIEF SUMMARY OF THE DRAWINGS

The present disclosure is now explained below in more detail with reference to the drawings.

In the drawings.

DETAILED DESCRIPTION

The drawings are only schematic in nature and serve only for understanding the present disclosure. The same elements are provided with the same reference signs.

Figure 1:
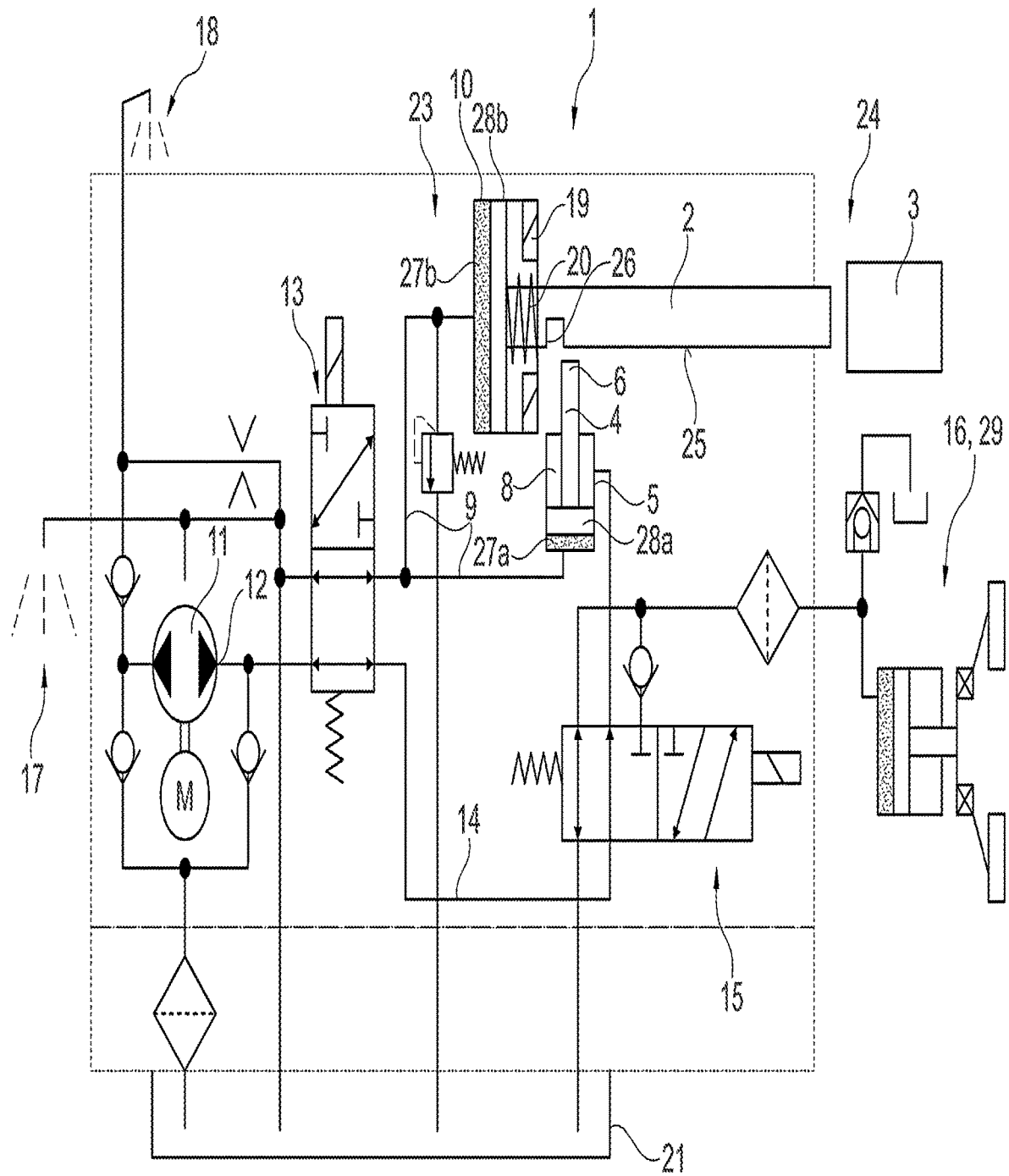
FIG. 1 shows a schematic diagram of a parking lock actuation system according to the present disclosure, designed according to a first exemplary embodiment, wherein a hydraulic connection of an actuation element and a locking element is clearly visible, and wherein the actuation element and the locking element are in a normal position in which a parking lock is active.

FIG. 1 clearly shows the basic structure of a parking lock actuation system 1 according to a first exemplary embodiment of the present disclosure. The parking lock actuation system 1 has a hydraulic unit 23/hydraulic side and a mechanism 24/mechanical side. The hydraulic unit 23 is coupled to the mechanism 24 via an actuation element 2. The hydraulic unit 23 also conventionally has additional hydraulic consumers 16, 17, 18. The hydraulic unit 23 is driven/supplied via a single pump 11 (reversible pump). The hydraulic unit 23 is therefore regarded as a component of the parking lock actuation system 1 for the following consideration.

The parking lock actuation system 1 is used to actuate a parking lock 3 in a typical manner, which is shown in simplified form in FIG. 1. In an activated position of the parking lock 3, an output component of the motor vehicle is locked, whereas the output component can be rotated freely in an inactive position of the parking lock 3 and can therefore be driven.

The actuation element 2 of the parking lock actuation system 1 is used directly to adjust the corresponding parking lock 3. The actuation element 2 is operatively connected to the hydraulic unit 23 via a (second) hydraulic actuation cylinder 10.

In addition to the (second) actuation cylinder 10 connected to the actuation element 2, in this embodiment there is a first consumer 16 in the form of a clutch actuation unit 29 comprising a slave cylinder, a second consumer 17 in the form of a coolant and lubricant supply device and a third consumer 18, also in the form of a coolant and lubricant supply device, in the hydraulic unit 23 (FIG. 1). The further structure and mode of operation of the parking lock actuation system 1 according to the present disclosure are described below with reference to the second exemplary embodiment in FIGS. 2 to 9, which second exemplary embodiment has the same structure as the first exemplary embodiment and differs only with respect to a check valve 22 of the first exemplary embodiment, which is inserted in a line section 14 described below. The following structure and the mode of operation of the parking lock actuation system 1 of the second exemplary embodiment consequently also apply to the parking lock actuation system 1 of the first exemplary embodiment.

Figure 2:
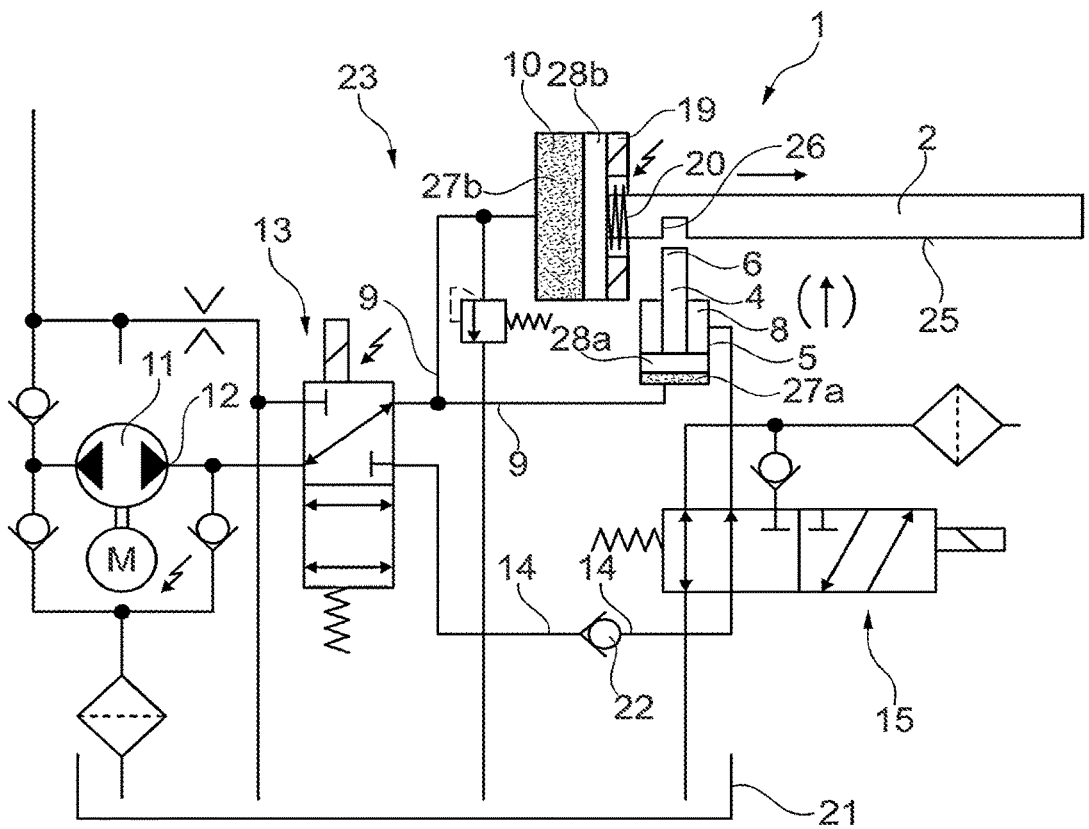
FIG. 2 shows a schematic diagram of a parking lock actuation system according to the present disclosure, designed according to a second exemplary embodiment, wherein a pressure chamber of an actuation cylinder of the actuation element and of the locking element is pressurized so that the actuation element is displaced from its normal position, which is designed as a locking position, according to FIG. 1 to its unlocking position, although the locking element is still arranged at a distance from the actuation element due to a filled unlocking pressure chamber.
Figure 3:
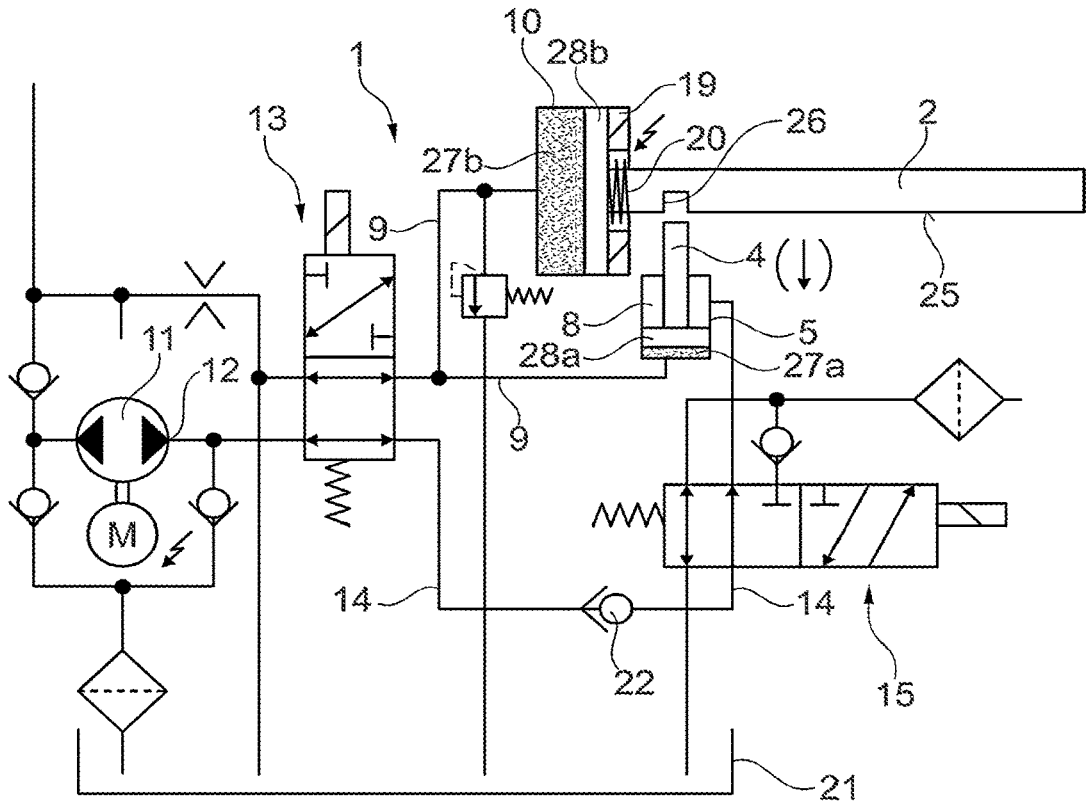
FIG. 3 shows a schematic diagram of the parking lock actuation system of the second exemplary embodiment, wherein, in contrast with FIG. 2, the pressure chambers of the two actuation cylinders are depressurized, but the unlocking pressure chamber of the locking element is subject to a pump pressure so that the locking element is supported reliably at a distance from the actuation element, and wherein a holding magnet holding the actuation element in the unlocking position is further activated.

The actuation element 2 is substantially realized as a piston rod and is preloaded by a preload spring 20 into a normal position serving as a locking position. In this locking position, the parking lock 3 is active (FIG. 1). When the second actuation cylinder 10 is subjected to hydraulic pressure, the actuation element 2 is pressed from its locking position against the spring force of the preload spring 20 into its unlocking position (FIG. 2). During normal driving operation of the motor vehicle, the actuation element 2 is held in the unlocking position by a holding magnet 19 that is also used as a stop. If the actuation element 2 is held in the unlocking position by the energized holding magnet 19, the hydraulic pressure on the second actuation cylinder 10 is again reduced relative to the state according to FIG. 2 or the second actuation cylinder 10 is depressurized (FIG. 3).

To actuate the second actuation cylinder 10, it is coupled/can be coupled via a first valve 13 to a pump 11/an outlet 12 of the pump 11. The first valve 13 is implemented as a 4/2-way valve. In a first position shown in FIG. 3, which is realized as a spring-preloaded rest position of the first valve 13, the second actuation cylinder 10, i.e. a (second) hydraulic pressure chamber 27b of the second actuation cylinder 10, is depressurized/connected to a tank 21. In a second position of the first valve 13, the pump outlet 12 is connected to the second actuation cylinder 10 according to FIG. 2. This second position corresponds to an electromagnetically activated position of the first valve 13.

According to the present disclosure, the parking lock actuation system 1 also has a locking element 4 which acts on the actuation element 2 and which is also actuated/adjusted by the hydraulic unit 23. The locking element 4 is implemented as a bolt/pin and can be displaced transversely with respect to the actuation element 2. The locking element 4 is coupled to a (first) actuation cylinder 5 of the hydraulic unit 23 and can be displaced thereby. This first actuation cylinder 5 is designed as a double-acting hydraulic actuation cylinder. Accordingly, the first actuation cylinder 5 has a (first) pressure chamber 27a and an unlocking pressure chamber 8 counteracting this first pressure chamber 27a. In its pressurized state, the first pressure chamber 27a consequently acts on a (first) piston 28a coupled to the locking element 4 in such a way that the locking element 4 is pressed in the direction of the actuation element 2. Accordingly, in its pressurized state, the unlocking pressure chamber 8 acts on the first piston 28a in such a way that the locking element 4 is pressed towards its normal position and thus into a position spaced apart from the actuation element 2/from an outer side 25 of the actuation element 2.

It can also be seen that the two pressure chambers 27a and 27b are connected to a common hydraulic fluid supply line 9. The two actuation cylinders 5, 10 are consequently connected to one another on the side of their pressure chambers 27a, 27b. This hydraulic fluid supply line 9 is then connected to the pump outlet 12 via the first valve 13.

The unlocking pressure chamber 8 is also connected or can be coupled hydraulically to the pump outlet 12 via a second valve 15 and via the first valve 13. The second valve 15 is designed as a 5/2-way valve. In a first position of the second valve 15, which is implemented as a spring-preloaded rest position, the unlocking pressure chamber 8 is connected to a line section 14 running between the first valve 13 and the second valve 15.

In this regard, it should be noted that the check valve 22 is inserted in precisely this line section 14 in the second exemplary embodiment. The check valve 22 is inserted in such a way that it blocks a return flow of hydraulic fluid from the unlocking pressure chamber 8 to the first valve 13 and enables/releases a hydraulic fluid flow from the first valve 13 to the unlocking pressure chamber 8. In the first exemplary embodiment in FIG. 1, this check valve 22 is dispensed with altogether.

Figure 5:
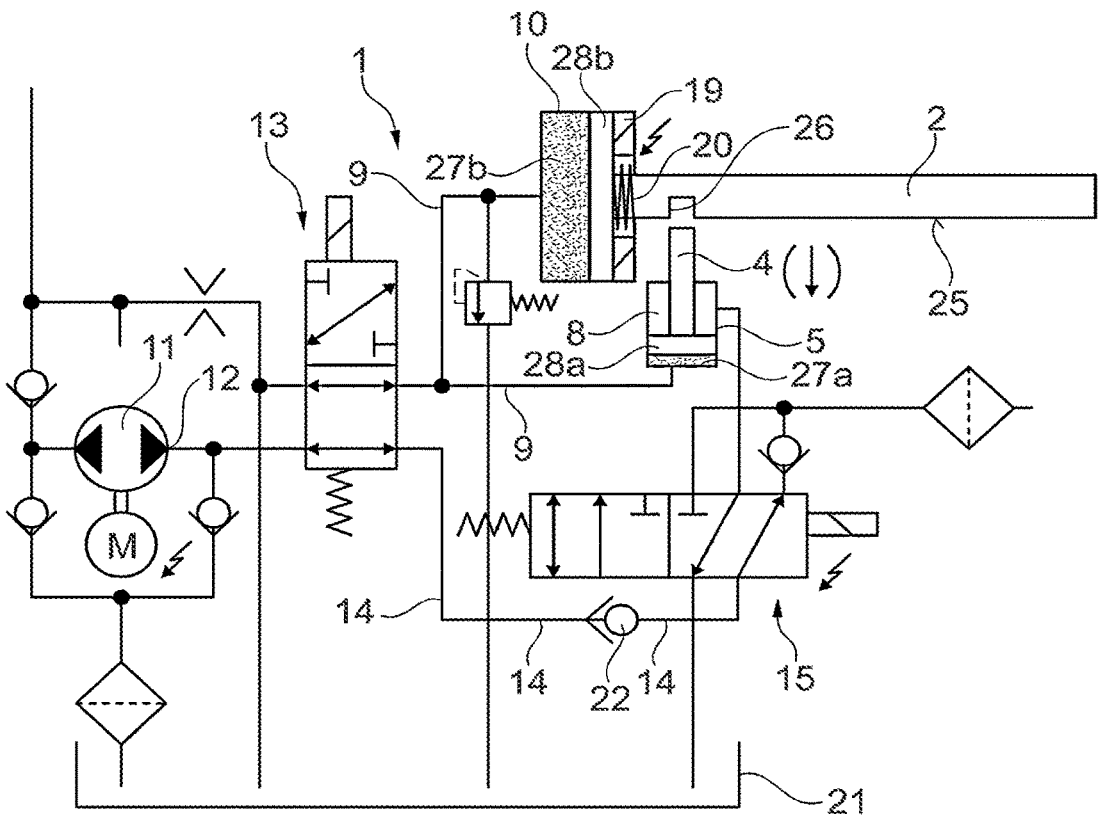
FIG. 5 shows a schematic diagram of the parking lock actuation system, wherein, in contrast with FIG. 4, the pump conveys a hydraulic fluid in the direction of a first valve connected upstream of the pressure chambers of the actuation cylinders, but the first valve and a valve connected downstream of the first valve are connected in such a way that the hydraulic fluid is directed towards a clutch actuation unit.

A second position of the second valve 15 is illustrated in FIG. 5. In this second position, the line section 14 is connected to the clutch actuation unit 29, while the unlocking pressure chamber 8 is depressurized/connected to the tank 21.

The locking element 4 is used for the form-fitting holding/locking of the actuation element 2 in its unlocking position, preferably for implementing a transport state and a limp-home functionality of the motor vehicle. The locking element 4 is provided with a retaining contour 6 at an end which faces the actuation element 2 and which can be brought into form-fitting engagement with the actuation element 2. This retaining contour 6 can be engaged in a complementary recess 26 (groove) of the moving element 2 in a form-fitting manner.

FIG. 2 initially shows how the control element 2 is brought into its unlocking position during normal driving operation and is fixed by the holding magnet 19. To move the actuation element 2 from its locking position according to FIG. 1 into its unlocking position according to FIG. 2, the pump 11 is operated in a first pumping direction so that it builds up a corresponding pressure at the outlet 12 facing the actuation cylinders 5, 10. By actuating/energizing the first valve 13, it is switched to its second position and thus enables the connection of the pump outlet 12 to the two pressure chambers 27a, 27b via the hydraulic fluid supply line 9. If the actuation element 2/the (second) piston 28b of the second actuation cylinder 10, connected to the actuation element 2, is in contact with the holding magnet 19 serving as a stop and consequently in its unlocking position, the holding magnet 19 is switched on/energized to fix the actuation element 2 in this unlocking position.

As can also be seen from FIGS. 2 and 3, the locking element 4 is kept at a distance from the actuation element 2 during normal driving operation in order to prevent the actuation element 2 from being locked by the locking element 4 in a form-fitting manner.

Depending on the present leakage in the hydraulic unit 23, the unlocking pressure chamber 8 can be specifically connected to the pump outlet 12 and pressurized for this purpose, as shown in FIG. 3, in order to keep the locking element 4 at a stable distance from the actuation element 2. For this purpose, the first valve 13 is brought back into its first position, in comparison with FIG. 2, so that the pressure at the pump outlet 12 reaches the unlocking pressure chamber 8 via the first valve 13 and the second valve 15. If the unlocking pressure chamber 8 is pressurized sufficiently, the check valve 22 (FIG. 4) closes automatically.

In principle, however, it is also possible, as indicated in FIG. 2, for the leakage to be relatively low and the locking element 4, despite the pressurization of the pressure chambers 27a, 27b, to remain at a distance from the actuation element 2 by means of the hydraulic fluid cushion present in the unlocking pressure chamber 8.

Figure 4:
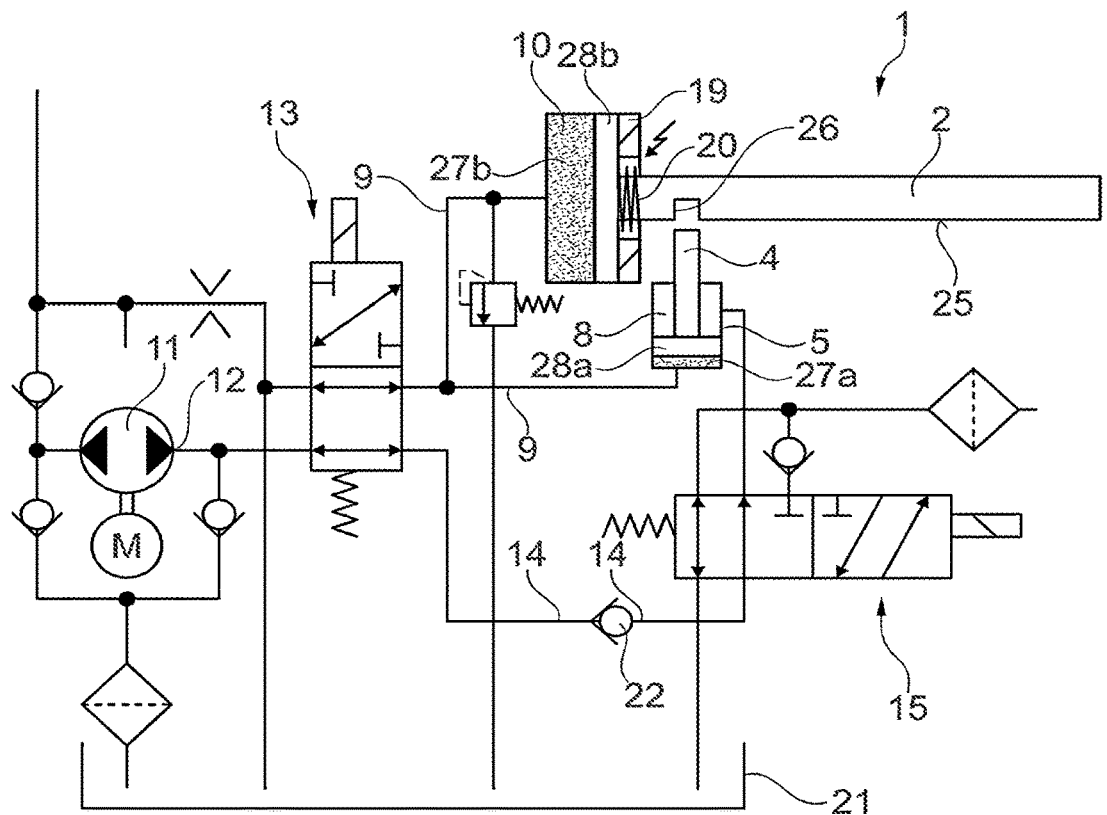
FIG. 4 shows a schematic diagram of the parking lock actuation system, wherein, in contrast with FIG. 3, both the pressure chambers of the two actuation cylinders and the unlocking pressure chamber of the locking element are depressurized and the pump is driven in such a way that it conveys a hydraulic fluid in a direction facing away from the actuation element and the locking element to two coolant and lubricant supply devices.

As also shown in FIGS. 4 and 5, it is possible during this normal driving operation of the motor vehicle to actuate the individual consumers 16, 17, 18 according to the pumping direction of the pump 11 and to supply them with hydraulic fluid. In FIG. 4, the pump 11 is operated, for example, in a second pumping direction that is counter to the first pumping direction and consequently supplies the second consumer 17 or third consumer 18 with hydraulic fluid. In FIG. 5, the pump 11 is again operated in its first pumping direction, wherein the outlet 12 is connected to the first consumer 16 in the form of the clutch actuation unit 29 via the corresponding positions of the valves 13, 15. In this state according to FIG. 5, the first valve 13 is in its first position, whereas the second valve 15 is in its second position.

Figure 6:
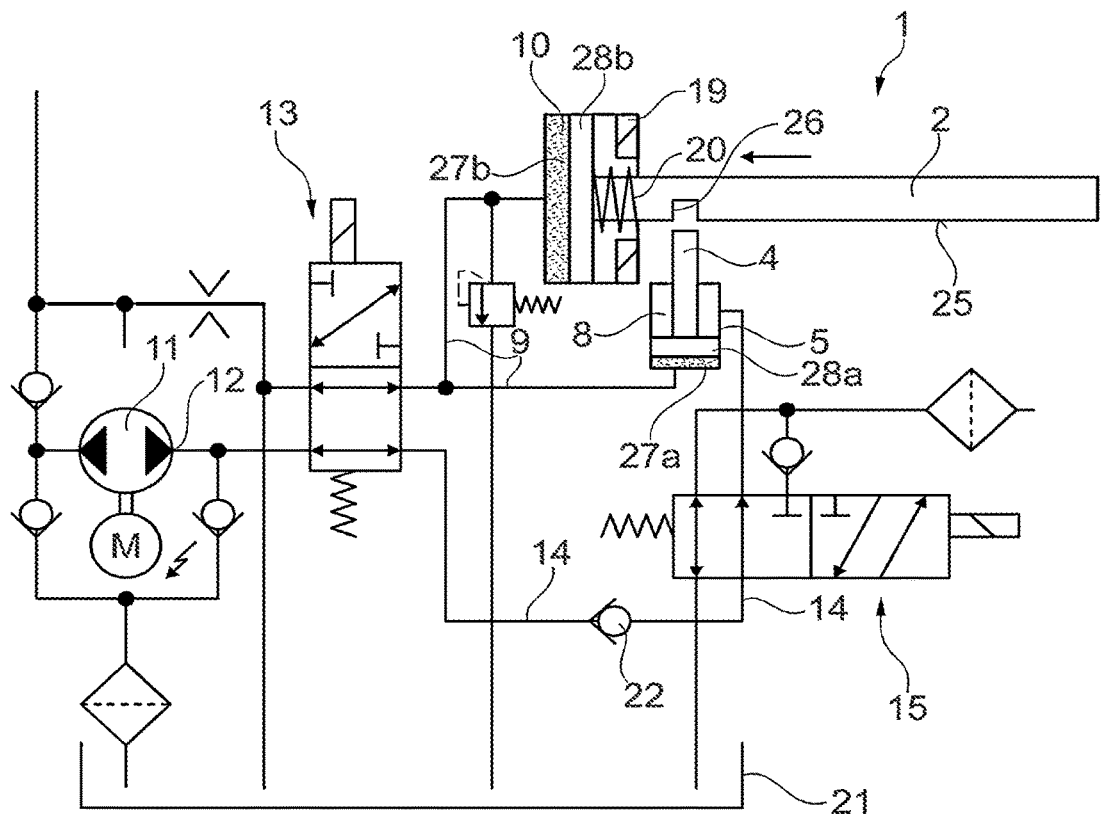
FIG. 6 shows a schematic diagram of the parking lock actuation system, wherein both the pump and the holding magnet are switched off compared to FIG. 5 and the pressure chamber of the actuation cylinder associated with the actuation element is depressurized so that the actuation element is pressed back into the normal position/locking position by its preload spring.

Implementing such a driving operation ensures that there is a so-called normally P functionality and that the parking lock 3 reliably locks/engages if the holding magnet 19 is no longer energized and the pump 11 is no longer operated. A corresponding automatic closing of the parking lock 3 is shown in FIG. 6.

Figure 7:
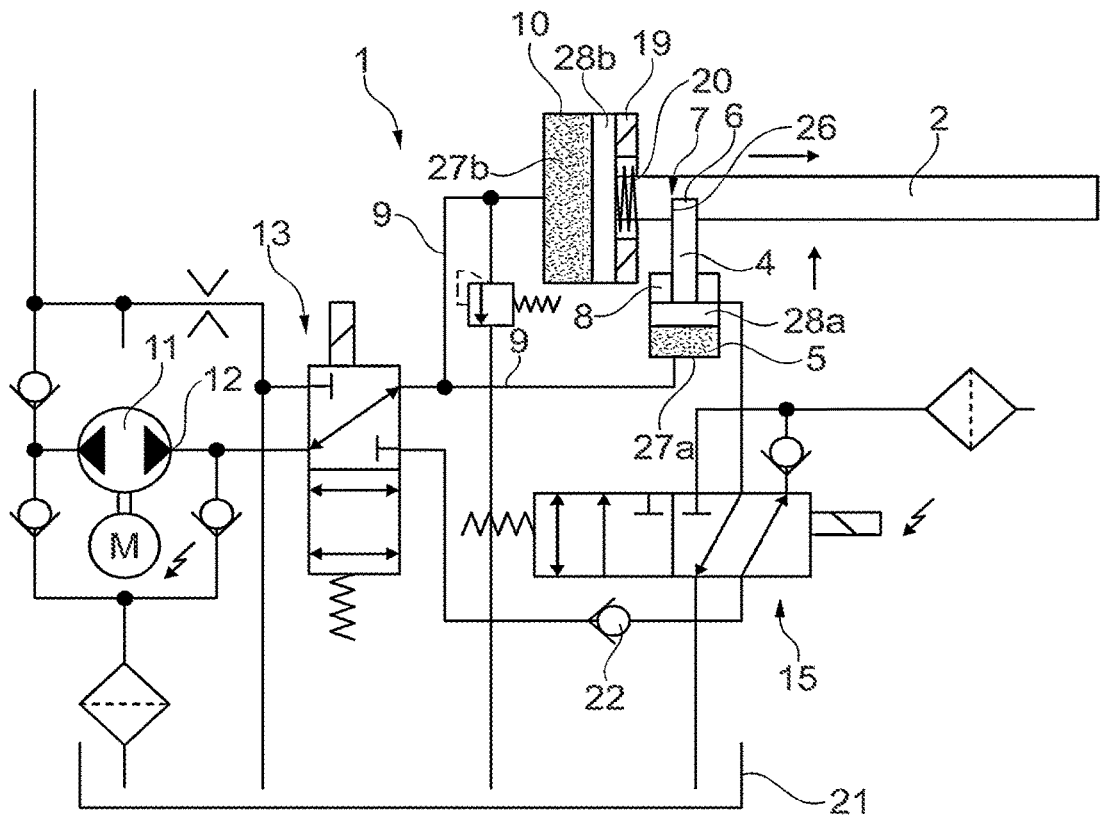
FIG. 7 shows a schematic diagram of the parking lock actuation system, similar to FIG. 2, wherein the first valve is connected in such a way that a hydraulic fluid conveyed by the pump to the pressure chambers presses the actuation element into its unlocking position and the locking element presses against the actuation element so that the actuation element is finally supported in its unlocking position in a form-fitting manner by a self-locking connection to a retaining contour of the locking element, and wherein the unlocking pressure chamber is simultaneously depressurized.
Figure 8:
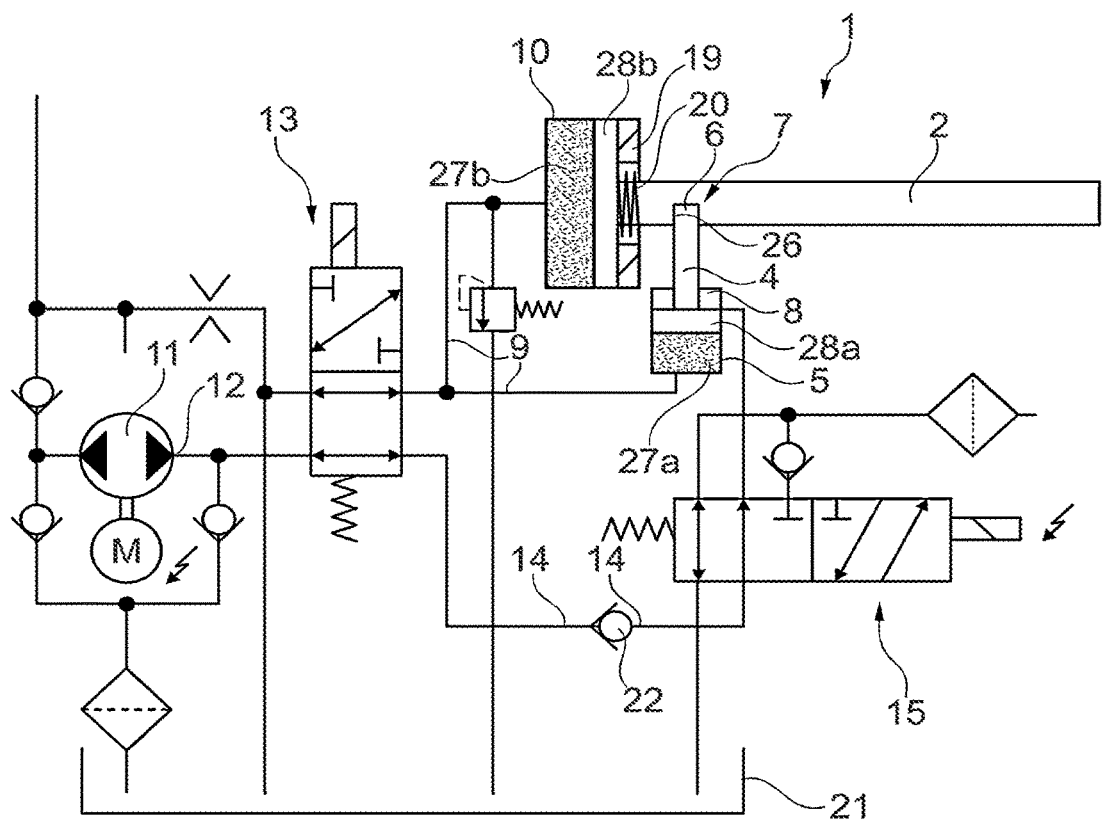
FIG. 8 shows a schematic diagram of the parking lock actuation system, wherein, in contrast with FIG. 7, the pump is again switched off and the pressure chambers are depressurized, but the actuation element remains in its unlocking position because of the self-locking connection with the locking element

As can be seen in FIGS. 7 and 8, the locking element 4 is brought into a form-fitting engagement with the actuation element 2 in a corresponding second operating state in order to realize a transport state or a limp-home functionality. For this purpose, according to FIG. 7, the pump 11 is operated in its first pumping direction and the two valves 13, 15 are each brought into their second position. Consequently, both pressure chambers 27a, 27b can be subjected to pump pressure and the actuation element 2 and the locking element 4 can be moved from their normal position to their extended position. Consequently, the locking element 4 comes into form-fitting engagement with the actuation element 2 and fixes it in its unlocking position.

Following this state shown in FIG. 7, the state according to FIG. 8 is reached, in which, in comparison with FIG. 7, the two valves 13, 15 are brought back into their second positions and the two pressure chambers 27a, 27b are depressurized. The form-fitting connection 7 between the locking element 4 and the actuation element 2 is implemented as self-locking. Accordingly, the locking element 4 remains in form-fitting engagement with the actuation element 2 in a self-locking manner, even if the second actuation cylinder 10 according to FIG. 8 is no longer pressurized by the pump 11. In this embodiment, this self-locking connection 7 is implemented in principle by corresponding coefficients of friction on the retaining contour 6 and on the regions of the recess 26 in contact with the retaining contour 6, but can also be further reinforced with additional form-fitting regions. Accordingly, in a further embodiment according to the present disclosure, a wedge region is provided on the retaining contour 6, which is arranged in such a way and rests against an undercut of the recess 26 shaped in a manner complementary to the wedge region that the locking element 4 is supported in its longitudinal direction on the actuation element 2 in a form-fitting manner. Owing to the fact that the actuation element 2 is preloaded in the direction of its normal position/locking position by the spring force of the preload spring 20, the spring force of the preload spring 20 has a reinforcing effect on the self-locking connection 7.

Figure 9:
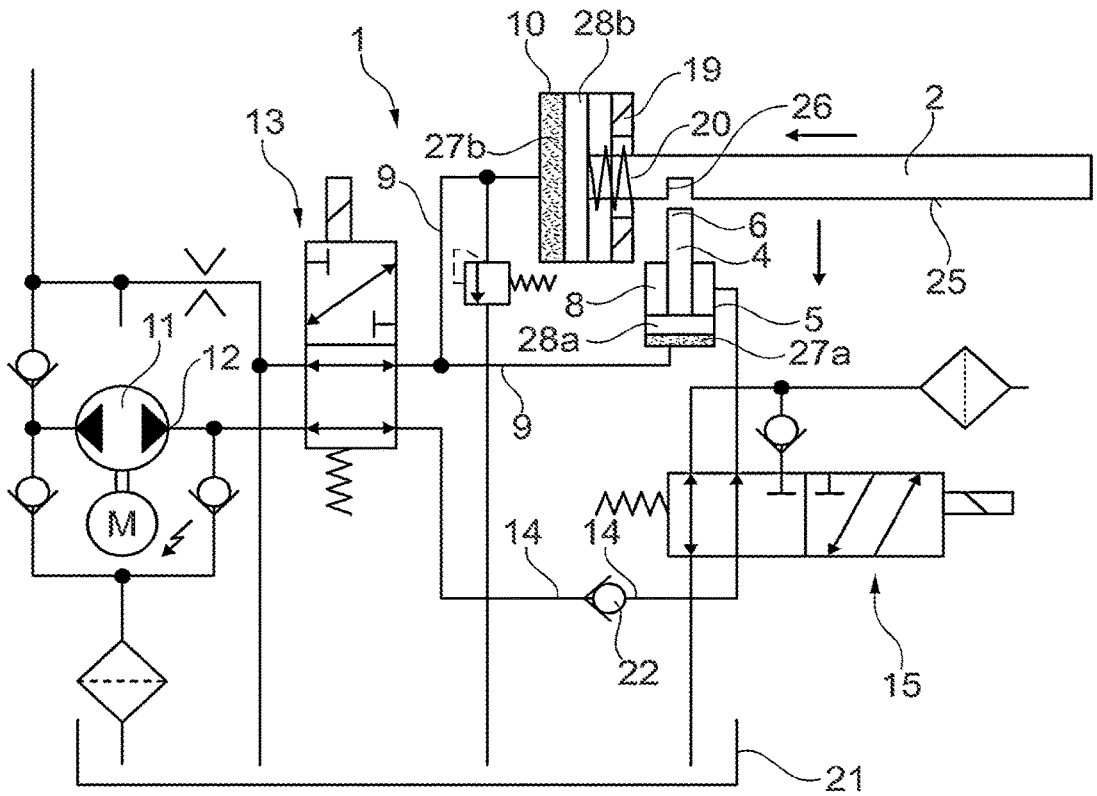
FIG. 9 shows a schematic diagram of the parking lock actuation system to illustrate a cancellation of the transport state again according to FIG. 8, wherein the locking element is pressed hydraulically in the direction of the holding magnet by pressurizing its unlocking pressure chamber in such a way that the self-locking connection between the locking element is canceled, and the actuation element and the locking element are pressed into their normal positions.

If, according to FIG. 9, after the locking of the actuation element 2 by means of the locking element 4 in its unlocking position, the actuation element 2 is to be unlocked again/the self-locking connection 7 is to be released again, in comparison with FIG. 8 by driving the pump 11 in the first pumping direction (and by realizing the first positions of the two valves 13, 15), the unlocking pressure chamber 8 is pressurized and the locking element 4 is pressed out of its form-fitting engagement with the actuation element 2 in the direction of its normal position so that the actuation element 2 is displaced into its locking position.

In other words, the parking lock actuation system 1 according to the present disclosure can be actuated as follows.

Starting from the engaged parking lock 3 (vehicle stationary), the parking lock 3 can be disengaged hydraulically in that the (reversible) pump 11 builds up pressure in the direction of the parking lock actuation cylinder 10, the valve 13 is energized and thus switched so that the pump 11 is connected to the parking lock actuation cylinder 10 and the holding magnet 19 is energized at the same time. The hydraulic pressure disengages the parking lock 3, and at the same time pressure builds up in the locking pressure chamber 27a. However, since the unlocking pressure chamber 8 is not connected to the tank 21, the locking element 4 cannot move in the direction of the form-fit element 2 and therefore does not engage (FIG. 2).

Now the valve 13 is switched (de-energized). Despite the now lack of pressure in the parking lock actuation cylinder 10, the parking lock 3 is kept disengaged by the holding magnet 19. Should the locking element 4 have engaged beforehand due to corresponding leakage, it is disengaged again at this point in time at the latest, since there is now pressure in the unlocking chamber 8 (FIG. 3).

If the cooling system 17, 18 is supplied during driving (volume flow in the cooling circuit, pumping direction reversed), there is no pressure in the pressure chambers 27a, 8 of the locking cylinder 5 due to the positions of the valves 13, 15. If necessary, the check valve 22 (FIG. 4) in the actuation line 14 can be omitted (according to FIG. 1) if the suction pressure of the pump 11 is not sufficient to engage the locking element 4 (pull it up; FIG. 4).

If an actuation is requested by an actuation unit 29 (e.g. clutch), the control valve 15 is energized so that it directs the pressure in the direction of the clutch 29. Again, there is no pressure on the locking cylinder 5 (FIG. 5).

If the power fails, the pump 11 stops, the two (all) valves 13, 15 go into their de-energized normal position (first position) and the holding magnet 19 de-energizes so that the parking lock 3 is no longer kept disengaged. For quick engagement of the parking lock 3, the oil volume present in the parking lock actuation cylinder 10 can now drain away directly into the tank 21 via the valve 13. The normally P functionality is thus guaranteed (FIG. 6).

If the transport mode is to be activated, the two valves 13, 15 are switched. If pressure is now built up by the pump 11, both the parking lock actuation cylinder 10, 27b and the locking pressure chamber 27a are pressurized so that the parking lock 3 is disengaged and the locking element 4 engages, since the pressure can drain away from the unlocking pressure chamber 8 towards the tank 21 (FIG. 7).

Now the power can be switched off (actively, power failure, battery empty, etc.). All valves 13, 15 go to their normal position, the pump 11 stops and the holding magnet 19 is inactive. Nevertheless, the parking lock 3 is now kept disengaged (passively) by the locked locking element 4 (FIG. 8).

In the same way as the transport mode, the limp-home functionality can also be represented in the event that the holding magnet 19 fails. The system 1, 23 is otherwise fully functional (cooling, actuation). Only the normally P functionality is no longer guaranteed, which is preferably displayed to the driver as an "error" with the instruction to visit a specialist workshop (FIG. 8).

LIST OF REFERENCE SIGNS

1 Parking lock actuation system
2 Actuation element
3 Parking lock
4 Locking element
5 First actuation cylinder
6 Retaining contour
7 Connection
8 Unlocking pressure chamber
9 Hydraulic fluid supply line
10 Second actuation cylinder
11 Pump
12 Outlet
13 First valve
14 Line section
15 Second valve
16 First consumer
17 Second consumer
18 Third consumer
19 Holding magnet
20 Preload spring
21 Tank
22 Check valve
23 Hydraulic unit
24 Mechanism
25 Outer side
26 Recess
27a First pressure chamber
27b Second pressure chamber
28a First piston
28b Second piston
29 Clutch actuation unit

What is claimed is:

1. A parking lock actuation system for a motor vehicle, the parking lock actuation system comprising:
   an actuation element coupleable or coupled to a parking lock, the actuation element being displaceable between a locking position, in which the parking lock is active, and an unlocking position, in which the parking lock is inactive; and
   a locking element configured to fix the actuation element in the unlocking position in a form-fitting manner;
   the actuation element and the locking element being each operatively connected to a respective hydraulic actuation cylinder, the hydraulic actuation cylinders being connected to a common hydraulic fluid supply line on a side of a respective pressure chamber and being coupled to a pump via a first valve, the hydraulic actuation cylinder of the locking element having an unlocking pressure chamber which counteracts the respective pressure chamber and which is coupleable to the pump via a second valve.

2. The parking lock actuation system according to claim 1, wherein the first valve is operatively inserted between an outlet of the pump and the common hydraulic fluid supply line and is configured in such a way that, in a first position of the first valve, the first valve depressurizes the hydraulic fluid supply line, while a line section further connected to the second valve is connected to the outlet of the pump, and, in a second position of the first valve, the first valve connects the pump outlet to the hydraulic fluid supply line, while the line section further connected to the second valve is separated from the pump outlet.

3. The parking lock actuation system according to claim 1, wherein the second valve is configured in such a way that, in a first position of the second valve, the second valve connects a pump-side line section to the unlocking pressure chamber and, in a second position of the second valve, depressurizes the unlocking pressure chamber.

4. The parking lock actuation system according to claim 3, wherein the second valve is configured and connected in such a way that the pump-side line section is connected to a further hydraulic actuation unit when the second valve is in the second position.

5. The parking lock actuation system according to claim 1, wherein the pump is coupled or coupleable to further hydraulic consumers.

6. The parking lock actuation system according to claim 1, wherein the pump is configured as a reversible pump.

7. The parking lock actuation system according to claim 1, further comprising an electrically actuated holding magnet holding the actuation element in the unlocking position.

8. A method for actuating the parking lock actuation system according to claim 1, comprising:
   pressing the actuation element, in a first operating state, into the unlocking position by connecting the hydraulic fluid supply line to an outlet of the pump and a corresponding pressure build-up at the outlet of the pump, while the locking element is spaced apart from the actuation element; and
   pressing the locking element, in a second operating state, in a pressurized state of the pressure chamber of the actuation cylinder associated with the locking element, against the actuation element so the locking element comes into engagement with the actuation element in the form-fitting manner.

9. The method according to claim 8, wherein the actuation element is spring-preloaded in such a way that, in the second operating state, in the unlocking position, the actuation element is pressed by a spring preload into a position reinforcing the form-fitting manner by a self-locking connection between the locking element and the actuation element and the locking element is clamped to the actuation cylinder of the actuation element when the pressure in the pressure chamber of the actuation cylinder associated with the actuation element drops.

10. The method according to claim 9, wherein the form fitting manner between the locking element and the actuation element is canceled and the locking element returns to the unlocking position of the first operating state in that the unlocking pressure chamber is pressurized via the pump until the self-locking connection between the locking element and the actuation element is canceled.

11. A parking lock actuation system for a motor vehicle, the parking lock actuation system comprising:
   an actuation element configured for coupling to a parking lock, the actuation element being displaceable between a locking position for locking the parking lock, and an unlocking position for unlocking the parking lock;
   a locking element configured engaging the actuating element in a form-fitting manner to fix the actuation element in the unlocking position;

a first hydraulic actuation cylinder including a first pressure chamber configured for moving the locking element with respect to the actuation element in a first direction;

a second hydraulic actuation cylinder including a second pressure chamber configured for moving the actuation element with respect to the parking lock;

a common hydraulic fluid supply line connected to the first pressure chamber and the second pressure chamber;

a pump;

a first valve; and a second valve, the pump being coupled to the common hydraulic fluid supply line via the first valve, the first hydraulic actuation cylinder having a counter pressure chamber configured for counteracting the first pressure chamber and for moving the locking element with respect to the actuation element in a second direction opposite the first direction, the counter pressure chamber being coupled to the pump via the second valve.

12. The parking lock actuation system according to claim 11, wherein the first pressure chamber is configured for moving the locking element into engagement with the actuation element and the counter pressure chamber is configured for moving the locking element out of engagement with the actuation element and is an unlocking pressure chamber.

13. The parking lock actuation system according to claim 11, wherein the second pressure chamber is configured for forcing the actuation element towards the parking lock.

14. The parking lock actuation system according to claim 11, further comprising a hydraulic fluid supply line section connecting the first valve and the second valve.

15. The parking lock actuation system according to claim 14, wherein the first valve is configured for connecting the hydraulic fluid supply line section to the pump for supplying fluid to the second valve.

16. The parking lock actuation system according to claim 15, wherein in a first position of the first valve, the first pressure chamber and the second pressure chamber are depressurized, and in a second position of the first valve, the first pressure chamber and the second pressure chamber are connected to the pump.

17. The parking lock actuation system according to claim 16, wherein in the first position of the first valve, the counter pressure chamber is connected to the pump.

18. The parking lock actuation system according to claim 14, wherein in a first position of the second valve, the counter pressure chamber is connected to the hydraulic fluid supply line section via the second valve, and in a second position of the second valve, the counter pressure chamber is depressurized.

19. The parking lock actuation system according to claim 14, further comprising a check valve in the hydraulic fluid supply line section such that the check valve blocks a return flow of hydraulic fluid from the counter pressure chamber to the first valve and enables a hydraulic fluid flow from the first valve to the counter pressure chamber.

20. The parking lock actuation system according to claim 11, wherein the locking element is a pin or a bolt and the actuation element includes a recess configured for receiving the pin or bolt such that the pin or bolt engages the recess in the form-fitting manner.

* * * * *